Feb. 24, 1925.

D. LOVELACE

ANIMAL TRAP

Filed July 26, 1924

WITNESSES:

INVENTOR,
Dan Lovelace.
BY
ATTORNEYS.

Patented Feb. 24, 1925.

1,527,891

UNITED STATES PATENT OFFICE.

DAN LOVELACE, OF CLINTON, OKLAHOMA.

ANIMAL TRAP.

Application filed July 26, 1924. Serial No. 728,390.

*To all whom it may concern:*

Be it known that I, DAN LOVELACE, a citizen of the United States, and resident of Clinton, in the county of Custer and State of Oklahoma, have invented a new and Improved Animal Trap, of which the following is a full, clear, and exact description.

This invention has relation to traps and has particular reference to an improvement in what are generally known as steel jaw traps, which include a pair of pivoted jaws, a spring for normally closing the same, a trigger mechanism for holding the jaws in open or set relation and a trigger release means adapted to support the bait.

By those versed in the art of trapping and familiar with the use of traps of this nature it has been observed that in practically all instances where the trap has been sprung and the animal has escaped, that a small twig, bit of bark or other obstruction has become lodged between the jaws at a point adjacent their hinged connection with the base of the trap. This is mainly due to the fault in the construction of the trap and so far as known is common to all traps now in general use and on the market as it is impossible for the trapper to make sure that the point of pivotal connection between the jaw is free and clear of any obstruction after the trap is concealed by the cover placed over it.

It is therefore the outstanding object of the present invention to positively eliminate the above recited fault and objection in the construction of steel jaw straps, by constructing the jaws in such a manner that upon springing of the trap, the jaws cooperate and function to dislodge and prevent obstructions from hindering the complete closing action thereof.

More specifically the invention contemplates an improvement in the construction of steel jaw traps in which the jaws cooperate with each other to set up a double camming action to automatically expel or project from between the same any obstructions which accidentally may lodge therebetween.

The invention further comprehends an improvement in steel jaw traps which is extremely simple, does not materially increase the cost of manufacture and which greatly adds to the efficiency of the same.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1:
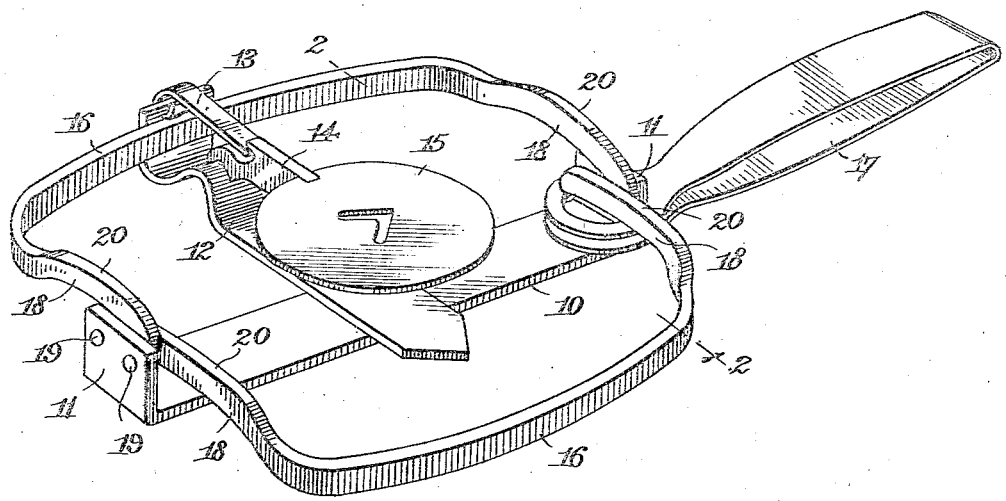
Figure 1 is a perspective view of the improved trap in set condition.

Referring to the drawings by characters of reference 10 designates the base member of the trap which usually consists of an elongated bar having up-turned terminals constituting bearing ears 11 and supporting medially thereof a transverse element 12 provided with a pivoted trigger 13, a trigger retaining and release element 14 and a bait plate 15. The trap further includes bail-like jaws 16 and a U-shaped spring 17 for normally swinging the jaws to a closed condition.

Figure 2:
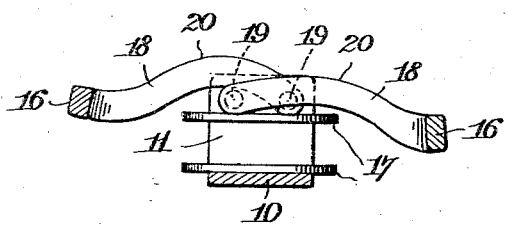
Figure 2 is a sectional view therethrough taken approximately on the line indicated at 2—2 in Figure 1.
Figure 3:
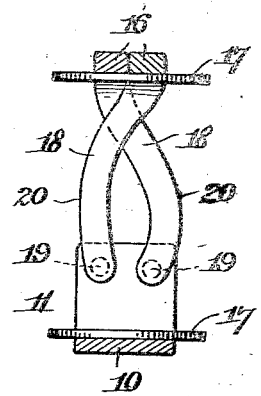
Figure 3 is a view similar to Figure 2 illustrating the trap in sprung condition.

The improvement constituting the present invention consists in a slight change in the shape of the arms 18 of the bail-like jaws 16 namely in arcing the arms as clearly illustrated in Figures 2 and 3 and further in pivoting the same at 19 to the bearing ears 11 so that the arcuate arms are arranged in crossed relation whereby the leading arcuate edges 20 of the arms cooperate to set up a double camming action as the same move from their opened or set position to the closed position. In other words the pivotal connection 19 of the extremities of the arms 18 of one jaw 16 are arranged adjacent the opposite side of the bearing ear 11 from that on which the bight of the jaw is disposed when the trap is in set condition.

Under this construction and arrangement a stick, twig, stem, bit of bark or other obstruction which lodges between the point of intersection of the arms, will be automatically expelled by the double camming or shearing action of the arcuate leading edges of the arms 18 when the jaws are swung under the action of the spring 17 from an open or set to a closed position. A further advantage derived from constructing the trap so that the arms 18 of the bail like jaws 16 are pivoted in crossed relation, resides in a substantial increase in the power exerted by the spring 17, which is due to the leverage gained, i. e., the spring engages the arms further from their pivotal points than in the ordinary construction. It thus follows that the trap will close more rapidly and will lift itself through and out of more snow, earth or covering than a trap of ordinary construction and that furthermore the expelling action is more effective and this without requiring a spring of greater strength. It will thus be seen that the improvement in the construction positively precludes the failure of the trap to properly function by reason of an obstruction lodging between the jaws close to their pivotal point and hence preventing complete closure of said jaws to grip and hold the animal's foot.

I claim:

1. In a steel jaw trap, a base member, a pair of jaws pivoted thereto on two parallel axes and in crossed relation to each other, the portions adjacent their pivotal points, having convex leading edges adapted to coact with any obstruction lodging therebetween to automatically cam the same to an out-of-the-way position, whereby to permit a complete movement of the jaws to a closed relation.

2. In a jaw trap, a base member, a pair of bail-like jaws pivoted at their opposite ends on two parallel axes to the base member with the leg portions of said jaw members in crossed relation, the said leg portions having convex leading edges adapted to coact with any obstruction lodging therebetween to effect an automatic camming and expulsion of the same to an out-of-the-way position whereby to prevent the obstruction of the complete closing movement of the jaws.

3. In a jaw trap of the character described, a base member, a pair of bail-like jaws having the opposite ends of their leg portions pivotally connected on two parallel axes to the base and in crossed relation to each other, said leg portions being of arcuate formation to provide convex leading edges adapted to coact with any obstruction lodging therebetween, whereby to automatically cam and expel said obstruction to an out-of-the-way position for permitting of complete movement of the jaws to closed relation.

4. In a jaw trap, a base member, a pair of bail-like portions having the opposite ends of their leg portions pivotally connected to the base member on two parallel axes and disposed in crossed relation to each other whereby the spring engages the leg portions of the jaws at a point further from the pivot to increase the leverage and power exerted by said spring.

DAN LOVELACE.